Patented Feb. 20, 1934

1,947,568

UNITED STATES PATENT OFFICE 1,947,568

CARRON OIL COMPOUND CHLORINATED CREAM

Harry Noonan, White Plains, N. Y., assignor to The Drug Products Co., Inc., Long Island City, N. Y., a corporation of New York No Drawing. Application September 27, 1930 Serial No. 484,934

1 Claim. (Cl. 167—63)

The invention relates to cream or emollient and has for its object to provide a new and useful composition of this character, which may be employed as an antiseptic, astringent and soothing application for the relief of pain and irritation of sunburn, minor burns of all descriptions, cuts, scalds, ordinary wounds, insect bites and stings, poison ivy and for general household use.

The composition and method of making the same will be fully described in the following specification:

The ingredients of the composition are as follows: benzocaine, aluminum acetate, zinc oxide, cottonseed oil, lime water, chloramine, lanolin, acid stearic, white solid petrolatum (so-called white vaseline), liquid petrolatum, white wax, borax, triethanolamine and acid benzoic with perfume.

The first step in manufacturing the product is to melt the lanolin anhydrous, acid stearic, white petrolatum, white wax and liquid petrolatum. In this mixture is dissolved the benzocaine and acid benzoic powder. In this first step it is preferable to do the melting at a temperature of 50° to 60° C.

In the second step the aluminum acetate powder, zinc oxide powder and cottonseed oil are rubbed in a mortar to a smooth paste. The triethanolamine is dissolved in lime water and all are mixed together. This mixture is passed through a colloid mill producing a saponified fine product, which would be called as intimate emulsion.

The third step comprises the mixture formed by the first step to the emulsion formed by the second step.

The fourth step comprises dissolving borax powder in aqua calcis and in this mixture dissolving chloramine. The mixture of borax, aqua calcis and chloramine is then added to the mixture formed by the third step and the complete mixture is stirred until effervescence ceases and the cream is emulsified after which a small amount of perfume may be added.

In actual practice the following proportion of ingredients have been found to work out excellently for the first step: lanolin anhydrous 18 pounds, acid stearic 5 pounds, white petrolatum solid 3 pounds, white wax 5 pounds, liquid petrolatum 10 pounds, benzocaine 1 pound, and acid benzoic powder 1 pound.

The following proportions of ingredients have been found desirable for the second step: aluminum acetate powder 1 pound, zinc oxide powder 5 pounds, cottonseed oil 25 pounds, triethanolamine 1 pound, and lime water 20 pints.

For the fourth step, one pound of borax powder, 5 pints of lime water and 2 pounds of chloramine U. S. P., have been found satisfactory.

It is desired not to limit the invention to the precise proportions of its ingredients as hereintobefore set forth, as such may be varied somewhat without materially changing the character of properties of the composition. Other materials having similar properties may be substituted for some of the materials heretofore mentioned and enumerated.

The aluminum acetate in the composition acts as an astringent and a mild antiseptic to relieve soreness, reduce inflammation and stimulate healing. The benzocaine acts as a soothing local anesthetic and is non-toxic and non-irritating. The zinc oxide also acts as a mild antiseptic and a sedative for ulcerations and minor wounds. The oil with the addition of the chloramine and acid benzoic acts as antiseptic fluid for easing pain and soreness in treating minor burns and wounds.

I claim:

A stable antiseptic cream containing, in addition to the usual unctuous bases, cottonseed oil, lime water, triethanolamine and chloramine, wherein the resulting Carron oil is in a substantially solid colloidal state and thoroughly homogenized with and dispersed through said bases and which, in this form, does not react with the slowly evolving chlorine liberated from the chloramine.

HARRY NOONAN.